United States Patent [19]

Konishi et al.

[11] 4,188,932
[45] Feb. 19, 1980

[54] INTERNAL COMBUSTION ENGINE WITH A SECONDARY COMBUSTION CHAMBER

[75] Inventors: Masami Konishi, Toyota; Norihiko Nakamura, Mishima; Shogo Sanda, Okazaki, all of Japan

[73] Assignee: Toyota Jidosha Kogyo Kabushiki Kaisha, Toyota, Japan

[21] Appl. No.: 849,260

[22] Filed: Nov. 7, 1977

Related U.S. Application Data

[63] Continuation of Ser. No. 616,996, Sep. 26, 1975, abandoned.

[30] Foreign Application Priority Data

Jul. 3, 1975 [JP] Japan .................................. 50-81400

[51] Int. Cl.² ............................................. F02B 19/12
[52] U.S. Cl. ......................... 123/191 S; 123/191 SP; 123/32 SP; 123/32 K
[58] Field of Search .......... 123/191 S, 191 SP, 32 SP, 123/32 ST, 32 K, 30 D; 313/143

[56] References Cited

U.S. PATENT DOCUMENTS

| 2,422,610 | 6/1947 | Bagnulo | 123/32 ST |
| 3,933,134 | 1/1976 | Yagi | 123/191 SP |
| 3,968,782 | 7/1976 | Noguchi | 123/191 S |
| 4,048,973 | 9/1977 | Sanda et al. | 123/32 SP |
| 4,098,246 | 7/1978 | Noguchi | 123/32 SP |

FOREIGN PATENT DOCUMENTS 2510556  9/1975  Fed. Rep. of Germany ....... 123/191 S Primary Examiner—Charles J. Myhre
Assistant Examiner—Jeffrey L. Yates
Attorney, Agent, or Firm—Stevens, Davis, Miller & Mosher

[57] ABSTRACT

An internal combustion engine comprising a primary combustion chamber, a secondary combustion chamber communicated with the primary combustion chamber through a passage, a spark plug with electrodes extended in said passage, and means for preventing the electrodes from being directly exposed to the burnt gas injected into the primary combustion chamber from the secondary combustion chamber through the passage.

2 Claims, 7 Drawing Figures

INTERNAL COMBUSTION ENGINE WITH A SECONDARY COMBUSTION CHAMBER

This is a continuation of application Ser. No. 616,996 filed Sept. 26, 1975, now abandoned.

This invention relates to an internal combustion engine with a secondary combustion chamber in which a lean mixture is used.

As is well known, it is possible in an internal combustion engine to use a lean mixture, i.e. a mixture with a large air-fuel ratio, in order to diminish noxious components contained in the exhaust gas, such as CO, HC and $NO_x$. The use of a lean mixture, however, presents difficulties in that the thermal efficiency of the engine and the rate of fuel consumption (g/hp.h) may be increased due to accidental combustion, or failure of ignition, and a low combustion speed respectively.

In order to obviate these drawbacks, there is known an internal combustion engine comprising a combustion chamber constructed by a primary and a secondary combustion chamber communicated with each other through a passage. The mixture in the secondary combustion chamber may first be burnt and the burnt flame thus developed in the secondary combustion chamber may be propagated through said passage into the primary combustion chamber to burn the mixture therein.

There are known, in general, two types of internal combustion engine with a secondary combustion chamber, one is a stratified combustion type and the other is a uniform mixture combustion type. In the former type, a rich mixture which can be easily ignited is first introduced through a secondary intake valve into the secondary combustion chamber and is ignited and burnt therein. This type of internal combustion engine presents advantages in that ignition can be easily and surely effected and also in that a very lean mixture can be introduced into and used in the primary combustion chamber.

While in the latter type, there is not provided means for initially introducing the mixture into the secondary combustion chamber, such as secondary intake valve means, the mixture can be pressed out of the primary combustion chamber into the secondary combustion chamber through a connecting passage during the compression stroke and can be ignited and burnt in the latter chamber. This type of internal combustion engine may have a simple construction, and be simple to manufacture and maintain, and is reliable in its operation. It presents, however, difficulties in that the lean mixture itself is inferior to the rich mixture in igniting efficiency and also in that the igniting efficiency becomes even worse due to the presence of residual gas produced by the previous combustion in the secondary combustion chamber.

In order to obviate these difficulties, the present applicant has provided in the Japanese Application No. 48-96016 an internal combustion engine with an ignition spark plug which has electrodes which are arranged in the passage communicating the primary combustion chamber with the secondary combustion chamber or are arranged at the end portion of said passage. In the invention of this previous application, only a fresh lean mixture exists near the electrodes of the spark plug since the fresh lean mixture sucked into the primary combustion chamber by way of the intake valve during the intake stroke may be pressed out of the primary combustion chamber into the secondary combustion chamber through said passage during the compression stroke. This results in pressing the residual gas produced by the previous combustion and remaining near the electrodes arranged in the passage or at end portion thereof, into the secondary combustion chamber. As a result of this, the lean mixture may be ignited with certainty and burnt without being subject to the influence of the residual gas, and then the burnt flame may be propagated into the primary combustion chamber to burn the mixture therein.

In the stratified combustion type of internal combustion engine, the electrodes of the spark plug are also preferably provided in or near the passage communicating the primary and the secondary combustion chambers. This is because of the fact that if the electrodes are not arranged in or near the passage but in the interior of the secondary combustion chamber and ignite the mixture therein, a part of unburnt rich mixture in the secondary combustion chamber is reversely pressed out of the secondary combustion chamber into the primary combustion chamber through the passage due to the expansion of the burnt gas in the secondary combustion chamber, resulting in decreasing the air-fuel ratio, that is resulting in enriching the mixture in the primary combustion chamber. This is contrary to the primary object of the stratified internal combustion engine which is to burn the lean mixture.

As is apparent from the above description, in any type of internal combustion engine with a secondary combustion chamber, it is preferable to provide the electrodes of the spark plug in or near the passage communicating the primary to the secondary combustion chamber. Such a provision, however, inevitably presents a drawback in that the electrodes, in particular the earthed electrode thereof may be heated to quite a high temperature. This is due to the fact that when the high temperature burnt gas, which is burnt in the secondary combustion chamber, is injected into the primary combustion chamber through the passage, the electrodes are directly exposed to the high temperature burnt gas, resulting in preignition and damage to the durability of the spark plug.

The present invention, therefore, provides an internal combustion engine with a secondary combustion chamber which overcomes the above mentioned drawback.

In the detailed description of the preferred embodiments of the invention presented below, reference is made to the accompanying drawings, in which.

Figure 1:
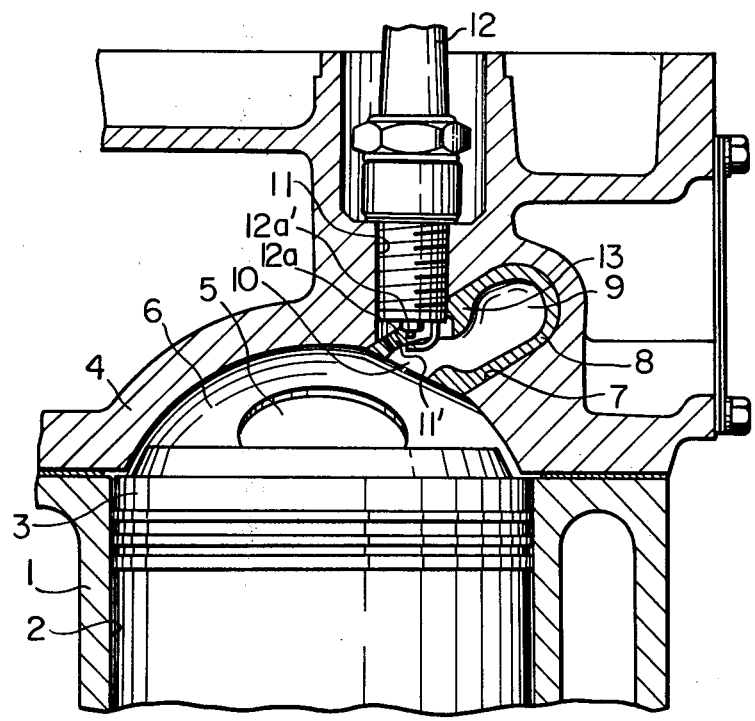
FIG. 1 is a sectional view of the main part of the internal combustion engine according to the first embodiment of the present invention.
Figure 2:
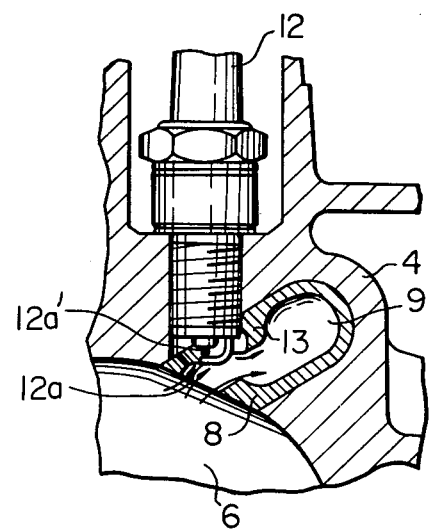
FIGS. 2 and 3 are partial views of FIG. 1, showing the flow of the gas.
Figure 3:
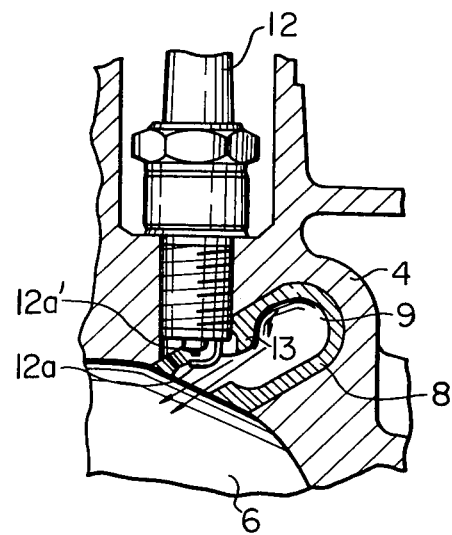

In FIGS. 1 to 3, showing a first embodiment of the present invention, a cylinder block and a cylinder formed therein are designated at 1 and 2, respectively. 3 and 4 show a piston provided in the cylinder 2 and a cylinder head on the cylinder block 1, respectively. A primary combustion chamber 6, which is referred to as a main chamber hereinafter, is defined between the inner periphery of the cylinder head 4 and the top surface of the piston 3 positioned at its T.D.C. (top dead center) position. There are provided in the main chamber 6 an intake valve 5 for sucking the mixture and an exhaust valve (not shown). There are also provided in the main chamber 6 at its upper portion a recess 7 in which an assembly 8 comprising a secondary combustion chamber 9, which is referred to as an auxiliary chamber hereinafter, and a passage 10 communicating the main chamber 6 with the auxiliary chamber 9 is press-fitted. The assembly 8 may preferably be made of a stainless steel having a high heat resistance. Alternatively, the auxiliary chamber 9 and the passage 10 may be directly provided in the cylinder head 4 without providing the assembly 8. A hole 11 is provided in the cylinder head 4 and a hole 11' is provided in the assembly 8. An ignition spark plug 12 is screwed into the hole 11 and the electrodes 12a and 12a', arranged in one end of the spark plug 12, extend into the hole 11'. The earthed electrode 12a is preferably projected into the passage 10. The assembly 8 is provided with a projection or barrier 13 for the purpose of deflecting the flow of the burnt gas injected into the main chamber 6 from the auxiliary chamber 9 as will be explained below in detail. The barrier 13 of the assembly 8 is positioned on the auxiliary chamber side of the spark plug 12, i.e. on the right of the electrode 12a' of the spark plug 12 in FIG. 1, and preferably adjacent to the electrode 12a' to effectively perform the above mentioned purpose. The size of the barrier 13, in particular the height thereof, is designed in such a way that the burnt gas injected into the main chamber 6 does not directly strike the electrodes 12a and 12a'. When the assembly 8 is not provided and the auxiliary chamber is directly formed in the cylinder head 4, the barrier 13 may similarly be formed by projecting a corresponding part of the cylinder head 4.

The operation of the first embodiment shown in FIGS. 1 to 3 is as follows.

The lean mixture sucked into the main chamber 6 through the intake valve 5 during the intake stroke is pressed into the auxiliary chamber 9 through the passage 10 in proportion to the upward movement of the piston 3 during the compression stroke. As said lean mixture passes through the passage 10 and flows into the auxiliary chamber 9 it strikes the electrodes, in particular the electrode 12a of the spark plug 12 as shown by arrows in FIG. 2. This results in the exhaust gas, produced by the previous combustion and remaining in the neighbourhood of the electrodes, being pressed into the interior of the auxiliary chamber 9 and, thus, the scavenging is performed. Thus, the lean mixture in the passage 10 can be ignited without fail by a spark discharge between the electrodes 12a and 12a', since when the mixture is ignited no residual gas exists in the neighbourhood of the electrodes.

After ignition, the flame is propagated in the auxiliary chamber 9 with a small volume by the gas flow from the main chamber into the auxiliary chamber and the combustion first takes place in the latter chamber. Then, the burnt gas produced by the above mentioned combustion is injected into the main chamber 6 through the passage 10, resulting in the ignition and combustion of the unburnt lean mixture therein. Since the injection speed of the burnt gas passing through the passage 10 into the main chamber 6 is extremely high, the burnt gas portion which is deflected by the barrier 13 of the assembly 8 flows linearly into the main chamber 6, as shown by arrows in FIG. 3, so that it does not substantially come into contact with the electrode 12a. Thus, the electrodes 12a, 12a' are not directly exposed to the high speed and temperature of the burnt gas, which solves the above mentioned difficulties, such as preignition and damage to the electrodes of the spark plug due to overheating.

Figure 4:
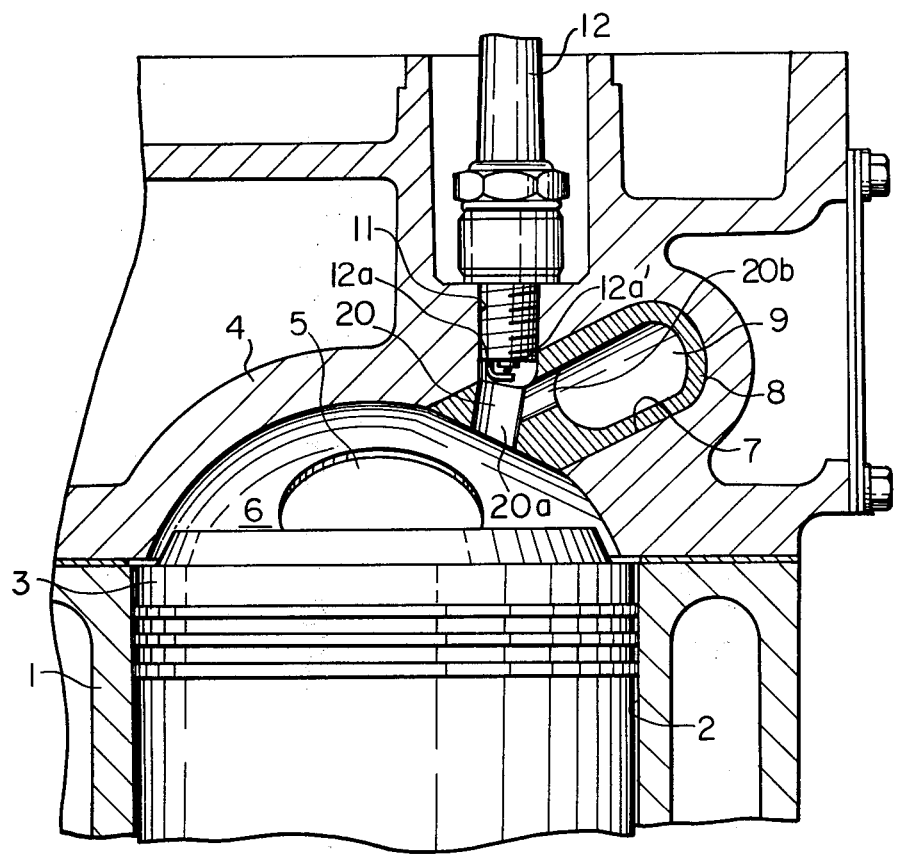
FIG. 4 is a sectional view similar to FIG. 1, according to the second embodiment of the present invention.
Figure 5:
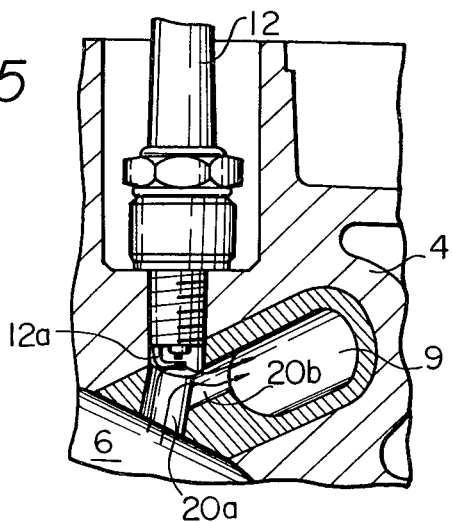
FIGS. 5 and 6 are partial views of FIG. 4, showing the flow of the gas.
Figure 6:
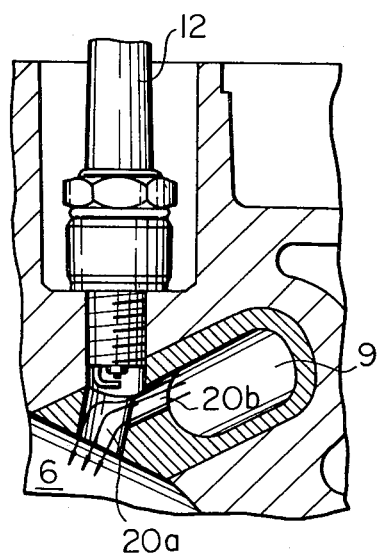

FIGS. 4 to 6 show a second embodiment of the present invention, in which elements and parts corresponding to those in FIGS. 1 to 3 have the same numerals as those in the latter.

In the second embodiment, there is a difference in the construction of the passage 20, communicating the main chamber 6 with the auxiliary chamber 9, in comparison with the first embodiment shown in FIGS. 1 to 3. The passage 20 in the second embodiment comprises two branch passages 20a and 20b communicating with one another. The branch passage 20a, positioned on the main chamber side, and the branch passage 20b, positioned on the auxiliary chamber side, are angularly connected. The electrodes 12a and 12a' are positioned in an extension of the passage 20a and not in the passage 20b.

The operation of the second embodiment is essentially similar to the first embodiment. When the lean mixture in the main chamber 6 is pressed into the auxiliary chamber 9 through the passages 20a and 20b, the lean mixture strikes the electrode 12a in the extension of passage 20a, scavenges the residual gas in the neighbourhood of the electrode 12a and flows into the auxiliary chamber 9 as shown in FIG. 5. The electrode 12a is preferably positioned in the extension of the passage 20a as near as possible to the axis of the passage 20b, but in such a way that it is not directly exposed to the burnt gas injected from the auxiliary chamber 9 into the main chamber 6.

When the gas burnt in the auxiliary chamber 9 is injected at high speed into the main chamber 6 through the passages 20b and 20a, the burnt gas does not directly strike the electrodes 12a and 12a' since the electrodes are not positioned in the passage 20b, as shown in FIG. 6. The angle defined between the passages 20a and 20b is suitably selected according to such factors as the volume ratio of the main chamber 6 and the auxiliary chamber 9 and the positional relationship therebetween.

Figure 7:
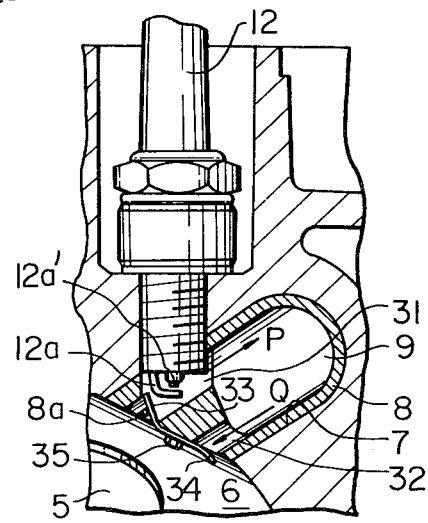
FIG. 7 is a sectional view similar to FIG. 1, according to the third embodiment of the present invention.

FIG. 7 shows a third embodiment of the present invention, in which elements and parts corresponding to those in FIG. 1 are designated by the same numerals as in the latter. In the third embodiment, the main chamber 6 and the auxiliary chamber 9 are communicated with each other through two separated passages 31 and 32. The passage 31 is, at its inlet portion, provided with a check valve (one-way valve) 33 to permit the mixture to flow into the auxiliary chamber 9 from the main chamber 6 only, as shown by an arrow P in FIG. 7. The passage 32 is, at its outlet portion, provided with a check valve (one-way valve) 34 to permit the burnt gas to flow into the main chamber 6 from the auxiliary chamber 9 only, as shown by an arrow Q in FIG. 7. The electrodes 12a and 12a' of the spark plug 12 are arranged in the passage 31. The check valves 33 and 34 are preferably formed integral with each other, as shown in FIG. 7, and are secured to the assembly 8 with the help of a securing member, such as bolt 35. The check valve 33 is preferably supported by, for example a portion 8a of the assembly 8, as shown in FIG. 7, in order to prevent the valve from being changed and destroyed under the effect of the burnt gas from the auxiliary chamber 9. In this embodiment, during the compression stroke the lean mixture in the main chamber 6 is pressed into the auxiliary chamber 9 through the passage 31 only, and thereby scavenges the residual gas in the neighbourhood of the electrodes 12a and 12a'. At this time, the check valve 34 is, of course, closed.

The burnt gas produced by the combustion in the auxiliary chamber 9 is injected into the main chamber 6 through the passage 32 only and, therefore, the electrodes 12a and 12a' are not exposed to the injection flow of the high temperature and speed burnt gas. At this time, the check valve 33 is, of course, closed.

It should be particularly appreciated that in the third embodiment, the passage 31 can be designated in such a way that the lean mixture passing therethrough meets the optimum igniting conditions and the passage 32 can be designed in such a way that the injection speed of the burnt gas meets the optimum combustion conditions in the main chamber, because the passage 31 in which the electrodes 12a and 12a are provided and the passage 32 through which the high temperature burnt gas passes are separately arranged.

The invention has been described in detail with particular reference to a uniform lean mixture combustion type of internal combustion engine, but it will be understood that the invention can also effectively apply to a stratified combustion type of internal combustion engine.

As is apparent from the above description, according to the present invention, the electrodes of the spark plug are not directly exposed to the injection flow of the high speed and high temperature burnt gas and the scavenging of the residual gas can be effectively effected, thereby to ensure ignition, to prevent preignition and to contribute to the durability of the spark plug.

What we claim is:

1. An internal combustion engine comprising a head defining a primary combustion chamber, a secondary combustion chamber connected to the primary combustion chamber through a substantially straight passage at one end of the secondary chamber and extending in a direction substantially parallel thereto, and a spark plug with an electrode extending into the passage, the mixture in the secondary combustion chamber being supplied thereto only through the passage and being first ignited and burnt by a spark from the spark plug, the mixture in the primary combustion chamber being then ignited and burnt by the burnt gas which is produced in the secondary combustion chamber and is injected into the primary combustion chamber through said passage, a projection, immediately adjacent said one end of the secondary chamber, projecting into the passage and extending in a direction transverse to the passage, and structurally distinct from the spark plug, for striking the flow of the mixture pressed out of the primary combustion chamber into the secondary combustion chamber through said passage against the electrode and for shielding the electrode from direct exposure to the flow of the burnt gas injected into the primary combustion chamber from the secondary combustion chamber, said projection being substantially coextensive with the portion of the spark plug which extends into the passage in a direction transverse to said passage.

2. An internal combustion engine comprising:
a cylinder;
a cylinder head;
a reciprocable piston in said cylinder;
said piston and said cylinder head defining a main combustion chamber therebetween;
means defining an auxiliary combustion chamber in said cylinder head into which fuel is supplied only from the main combustion chamber;
means defining a substantially straight passage in said cylinder head directly fluidly interconnecting said main combustion chamber and said auxiliary combustion chamber, said passage extending in a direction substantially parallel to the auxiliary combustion chamber, one end of said passage opening directly into said auxiliary combustion chamber and the other end thereof opening directly into said main combustion chamber;
a spark plug having an electrode extending into said passage;
a projection adjacent said electrode, extending in a direction transverse to said passage and projecting into said passage at said one end of the auxiliary combustion chamber for directing the flow of fuel from the main combustion chamber into the passage against the electrode and for directing the flow of burnt fuel from the auxiliary combustion chamber into the passage away from the electrode, said projection being substantially coextensive with the portion of the spark plug which extends into the passage in a direction transverse to said passage.

* * * * *